Oct. 2, 1923.
H. FLETCHER
TESTING SYSTEM
Filed Oct. 19, 1922
1,469,271
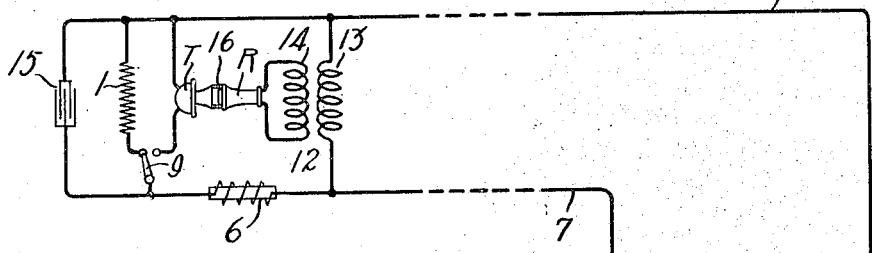
Fig. 1.
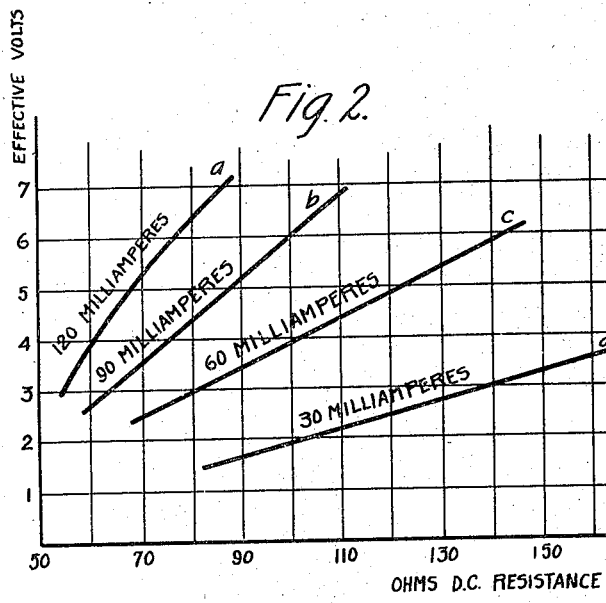
Fig. 2.
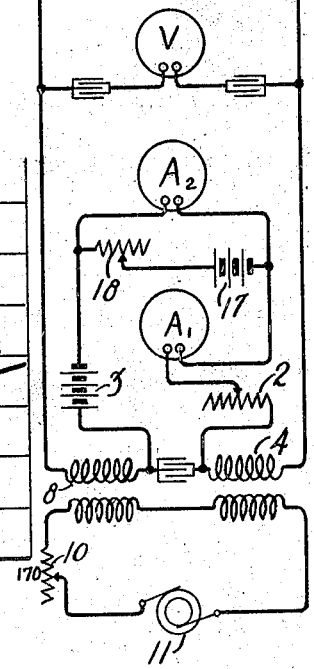
Inventor:
Harvey Fletcher,
by Joel C.S. Palmer Atty.

Patented Oct. 2, 1923.

1,469,271

UNITED STATES PATENT OFFICE.

HARVEY FLETCHER, OF NEW YORK, N. Y., ASSIGNOR TO WESTERN ELECTRIC COMPANY, INCORPORATED, OF NEW YORK, N. Y., A CORPORATION OF NEW YORK.

TESTING SYSTEM.

Application filed October 19, 1922. Serial No. 595,503.

*To all whom it may concern:*

Be it known that I, HARVEY FLETCHER, a citizen of the United States, residing at New York, in the county of New York, State of New York, have invented certain new and useful Improvements in Testing Systems, of which the following is a full, clear, concise, and exact description.

This invention relates to systems for determining the efficiency of telephone apparatus and particularly to a system for testing the efficiency of subscribers' transmitters.

The object of this invention in general is to provide a convenient and efficient system for readily determining the efficiency of a subscriber's transmitter.

In accordance with the general features of this invention, a subscriber's transmitter is subjected to standard agitation by means of a standard receiver energized by a standard amount of current sent from the central office. The alternating voltage generated by the transmitter due to the agitation may be determined by measuring the change in the effective value of the direct current resistance of the transmitter; and by taking the ratio of the voltage generated by the transmitter to the known value of voltage which a standard transmitter generates under like conditions, a measure of the efficiency of the subscriber's transmitter from a telephone standpoint is obtained.

This invention is particularly applicable to the testing of subscribers' transmitters which are in service at a way station but is not limited to this application.

Referring to the drawings, Fig. 1 shows schematically a subscriber's loop and the connected apparatus used in making a test. Fig. 2 shows characteristic curves giving the relation between the alternating voltage generated by a certain type of transmitter and the effective direct current resistance of the transmitter, when the transmitter is subjected to various degrees of agitation.

In order to make a test, two men are required, one to make the circuit changes and adjustments at the substation, and the other to make them at the central office. The subscriber's transmitter T is replaced by resistance 1 which has a value equal to the average direct current resistance of a transmitter when subjected to standard agitation. Resistance 2 is then adjusted until meter $A_1$ shows that battery 3 is causing the desired amount of direct current, e. g., 90 milliamperes, to flow through winding 4, line conductor 5, resistance 1, choke coil 6, line conductor 7, and winding 8. The direct current is then caused to flow through transmitter T by substituting the transmitter for resistance 1. If desired, the substitution of resistance 1 for transmitter T, and vice versa, may be accomplished by means of a switch 9.

Resistance 10 is adjusted until alternating current voltmeter V shows that a predetermined standard value of alternating voltage is being applied to the line by source 11. Source 11 is preferably a generator which delivers a voltage having a frequency amplitude characteristic corresponding approximately to the frequency amplitude characteristic of speech. The alternating current passes over the line and energizes standard receiver R, which is connected in bridge of the line by means of a transformer 12 having primary winding 13 and secondary winding 14. A choke coil 6 prevents this receiver energizing circuit from passing through transmitter T and condenser 15. It is preferable that transformer 12 have such a high impedance, of the winding 13, that the receiver R will always give the same output for a definite voltage indicated by meter V regardless of the length of the subscriber's loop.

Receiver R which is now giving a standard output is acoustically coupled to transmitter T thereby subjecting the transmitter to standard agitation. If desired, a tube 16 may be employed to enclose an air column between the transmitter and the receiver. Due to the agitation, transmitter T suffers an increase in the effective value of its direct current resistance thereby causing a decrease in the direct current which is indicated by meter $A_1$. This decrease in current is a function of the increase in resistance of the transmitter and hence a function of the alternating voltage generated by the transmitter, as is shown by Fig. 2. For the example chosen, curve *b* of Fig.

2 is the one of interest since it shows the relation between the alternating voltage generated by a certain type of transmitter and the effective value of the direct current resistance of the transmitter, for the case where the steady state direct current through the transmitter is 90 milliamperes.

Meter $A_1$ must be of relatively high range, which for the example chosen, would mean a full scale deflection of at least 90 milliamperes. Such a meter may not sufficiently accurately indicate changes in the value of direct current caused by the increase in resistance of transmitter T. To obtain more accurate readings in current change, a second meter $A_2$ of relatively low range, e. g., 15 milliamperes full scale deflection, may be inserted in series with meter $A_1$ and set back by means of a shunt connected battery 17 in series with a resistance 18, so as to render meter $A_2$ operative to indicate changes in a current of the order of 90 milliamperes.

When this arrangement is used, the transmitter direct current is adjusted by shifting resistance 2 until meter $A_1$ indicates the desired standard value such as 90 milliamperes. Then resistance 18 is adjusted to produce a desired standard setting of meter $A_2$, e. g., 10 milliamperes. Upon agitation of the transmitter, meter $A_2$ will take up a change in deflection which is a function of the change in resistance of transmitter T and hence a function of the alternating voltage generated by the transmitter. If desired, this meter may be calibrated to read directly the alternating voltage generated by the transmitter, and by taking the ratio of this voltage to the known voltage which a standard transmitter generates under like conditions, a measure of the efficiency of the subscriber's transmitter T is obtained. This ratio may be converted into miles of standard cable or other transmission unit, as is well understood in the art.

If $v_1$ is the voltage generated by the subscriber's transmitter and $v_2$ is the known voltage generated by a standard transmitter under like conditions, it is apparent that ratio $v_1$ is equal to a constant times $v_2$ for any particular type of transmitter which is being tested; and hence, if desired, meter $A_2$ may be calibrated to read the efficiency of the subscriber's transmitter T directly in terms of miles of standard cable or other convenient transmission unit.

In the specification, mention is made of values of current, but it is to be understood that these values are merely illustrative, and that values of current voltage and resistance should be chosen which are the most suitable for the apparatus involved.

It is seen that a method and apparatus have been provided whereby the efficiency of a subscriber's transmitter can be readily determined without the transmitter being removed from the subscriber's station or a ground return being used between the subscriber's station and the central office.

The invention claimed is:

1. The method of determining the efficiency of a subscriber's transmitter which comprises subjecting the transmitter to a definite agitation, indirectly measuring the alternating voltage generated by said transmitter by means of a device responsive to change in direct current through the transmitter, and comparing said voltage to the voltage generated by a standard transmitter when subjected to the same conditions.

2. A method of determining the efficiency of a subscriber's transmitter which comprises connecting said transmitter in bridge of the subscriber's end of a line; agitating said transmitter by means of a standard receiver acoustically coupled to said transmitter and energized by current transmitted over said line; indirectly obtaining a measure of the alternating voltage generated by the transmitter by means of an instrument located at the central office and responsive to the change in direct current through said transmitter; and comparing said voltage to the voltage generated by a standard transmitter when subjected to the same conditions.

3. In a system for measuring the efficiency of a telephone transmitter, a transmission line across which the transmitter is bridged, a receiver in brridge of the transmission line, means for sending direct current over the transmission line to said transmitter, means for sending alternating current over the transmission line to energize said receiver, and means for measuring the voltage which causes said alternating current to flow.

4. In a system for measuring the efficiency of a telephone transmitter, a transmission line across which the transmitter is bridged, a receiver in bridge of the transmission line, means for sending direct current over the transmission line to said transmitter, means for sending alternating current over the transmission line to energize said receiver, means for measuring the alternating voltage which causes said alternating current to flow, and means for substantially excluding said alternating current from said transmitter.

5. In a system for measuring the efficiency of a telephone transmitter, a transmission line across which the transmitter is bridged, a receiver in bridge of the transmission line, means for sending direct current over the transmission line to said transmitter, means for sending alternating current over the transmission line to energize said receiver, said alternating current having energy-frequency spectrum corresponding approximately to voice current, and means for measuring the voltage which causes said alternating current to flow.

6. In a system for measuring the efficiency of a telephone transmitter, a transmission line across which the transmitter is bridged, a receiver in bridge of the transmission line, means for sending direct current over the transmission line to said transmitter, means for sending alternating current over the transmission line to energize said receiver, means for measuring the voltage which causes said alternating current to flow, and means responsive to changes in the direct current through said transmitter.

7. In a system for measuring the efficiency of a telephone transmitter, a transmission line across which the transmitter is bridged, a receiver in bridge of the transmission line, means for sending direct current over the transmission line to said transmitter, means for sending alternating curernt over the transmission line to energize said receiver, means for measuring the voltage which causes said alternating current to flow, means for substantially excluding said alternating current from said transmitter, and means responsive to changes in the direct current through said transmitter.

In witness whereof, I hereunto subscribe my name this 17th day of October A. D., 1922.

HARVEY FLETCHER.